US006754667B2

(12) United States Patent
Kim et al.

(10) Patent No.: US 6,754,667 B2
(45) Date of Patent: Jun. 22, 2004

(54) CONTENT-BASED IMAGE RETRIEVAL SYSTEM AND METHOD FOR RETRIEVING IMAGE USING THE SAME

(75) Inventors: Whoi-Yul Kim, Seoul (KR); Yong-Sung Kim, Seoul (KR); Young-Sum Kim, Taejon (KR)

(73) Assignee: Konan Technology, Inc., Seoul (KR)

( * ) Notice: Subject to any disclaimer, the term of this patent is extended or adjusted under 35 U.S.C. 154(b) by 210 days.

(21) Appl. No.: 09/728,450

(22) Filed: Dec. 1, 2000

(65) Prior Publication Data

US 2002/0010704 A1 Jan. 24, 2002

(30) Foreign Application Priority Data

Dec. 1, 1999 (KR) ..................................... 1999-054300

(51) Int. Cl.[7] ............................................. G06F 17/30
(52) U.S. Cl. .............................. 707/102; 707/2; 707/3; 707/4; 707/5; 707/6; 382/305
(58) Field of Search .......................... 707/5, 6, 2, 102; 382/125, 305, 197

(56) References Cited

U.S. PATENT DOCUMENTS

| | | | | |
|---|---|---|---|---|
| 4,747,147 A | * | 5/1988 | Sparrow ..................... | 382/125 |
| 5,465,353 A | * | 11/1995 | Hull et al. .................... | 707/5 |
| 5,684,999 A | * | 11/1997 | Okamoto .................... | 382/305 |
| 5,893,095 A | | 4/1999 | Jain et al. ..................... | 707/6 |
| 6,016,487 A | * | 1/2000 | Rioux et al. .................. | 707/2 |

FOREIGN PATENT DOCUMENTS

JP 11250106 12/1998

OTHER PUBLICATIONS

Derrode et al., "Invariant content–based image retrieval using a complete set of Fourier–Mellin descriptors", Proceedings IEEE International Conference on Multimedia Computing and Systems, pp. 877–881, vol. 2, Jun. 1999.
Gevers et al., "The PicToSeek WWW image search system", Proceedings IEEE International Conference On Multimedia Computing And Systems, pp. 264–269, vol. 1, Jun. 1999.
"Querying Image Databases Using Computed Textured Features", IBM Technical Disclosure Bulletin, pp. 207–208, vol. 36, No. 6B, Jun. 1993.
Cariou et al., "A multiscale and multiorientation recognition technique applied to document interpretation: application to the French telephone network maps", International Journal of Pattern Recognition and Artificial Intelligence, vol. 13, No. 8, pp. 1201–1218, Dec. 1999.
Sheng et al., "Invariant pattern recognition using Fourier-Mellin transforms and neutral networks", Journals of Optics, vol. 22, No. 5, pp. 223–228, Sept.–Oct. 1991.

* cited by examiner

*Primary Examiner*—Wayne Amsbury
*Assistant Examiner*—CamLinh Nguyen
(74) *Attorney, Agent, or Firm*—Baker Botts LLP (57) ABSTRACT

A content-based image retrieval system retrieves an image based on an angular radial transform (ART) image descriptor. In the content-based image retrieval system, a method for retrieving an image includes the steps of: a) receiving a query image; b) extracting a query image descriptor from the query image based on at least an angular component and a radial component of the query image; c) comparing the query image descriptor with an image descriptor stored on the database; and d) determining a degree of a similarity between the query image descriptor and the image descriptor stored on the database.

61 Claims, 5 Drawing Sheets

FIG.5

CONTENT-BASED IMAGE RETRIEVAL SYSTEM AND METHOD FOR RETRIEVING IMAGE USING THE SAME

FIELD OF THE INVENTION

The present invention relates to a content-based image retrieval system and a method for retrieving an image using the same; and, more particularly, to a content-based image retrieval system and a method for retrieving an image based on an angular radial transform (ART) image descriptor.

DESCRIPTION OF THE PRIOR ART

As Internet techniques have developed and use of multimedia data is increased in rapid, an image retrieval based on a text cannot guarantee reliability in results of the retrieval. To solve the problem as mentioned above, an image retrieval based on an image is performed.

The image retrieval based on the image means a method for finding an image (or images) similar to a query image by extracting an image descriptor describing a characteristic of the image from the image; and measuring a similarity between an image descriptor of the query image inputted by the user and that of an image stored on a database. The image descriptor includes a color descriptor, a texture descriptor and a shape descriptor, which respectively describes a color of the image, a texture of the image and a shape of the image. An efficiency of the image retrieval system depends on how much image descriptor efficiently describes characteristics of the image.

A moment descriptor is mostly used as a conventional shape descriptor. The moment descriptor is invariant to a size, a movement and a rotation of the image.

To obtain the moment descriptor of the input image, first, an edge extraction is processed. In other words, an object of the image is separated from a background. The image data is converted to binary data. Then, an outer boundary line of the object is extracted from the separated background and a shape vector of the object is obtained from the separated object.

In order to measure a similarity between the input image and an image stored on a database, a Euclidean distance measurement method is used. The Euclidean distance measurement method is expressed as following equation (1).

$$D(q, t) = (H_q - H_t)^T (H_q - H_t) \quad (1)$$
$$= \sum_{m=0}^{M} (H_q[m] - H_t[m])$$

where, q is an input image, t is an image stored on a database, $H_q$ is a moment value of the input image q, $H_t$ is a moment value of the image stored on the database and M is an integer number between 0 and 6.

In the conventional content-based image retrieval system based on the moment descriptor, since the polynomial function used as a basis function is not orthogonal, extracted moment values, which are descriptors, are overlapped. Accordingly, an efficiency of the descriptor is low, and the descriptor cannot represent characteristics of the image, which are recognized by a user. Accordingly, the conventional content-based image retrieval system has a serious problem in that it cannot retrieve a similar image.

In order to solve the problem as mentioned above, some content-based retrieval systems based on a Zernike moment are developed. One of them is described in a pending U.S. patent application Ser. No. 09/203,569 filed on Dec. 2, 1998, "Method for Automatic Retrieval of Device-Mark Type Trademark Images Based upon Content of Trademark".

The Zernike moment has an orthogonal value, however, may not effectively represent characteristics of the image in a radial direction. Accordingly, the conventional content-based image retrieval system based on the Zernike moment cannot perform an accurate image retrieval.

SUMMARY OF THE INVENTION

Therefore, it is an object of the present invention to provide a content-based image retrieval system and a method for retrieving image using the same, which are possible to search more similar image to a query image within a shorter time.

In accordance with an aspect of the present invention in order to obtain the object, there is provided a method for constructing a database storing images and image descriptors representing characteristics of the images, the method comprising the steps of: a) receiving an image; b) extracting an image descriptor from the image based on at least an angular component and a radial component of the image; c) storing the image on an image database; and d) storing the image descriptor on an image descriptor database.

In accordance with another aspect of the present invention, there is provided a method for retrieving an image in a content-based image retrieval system including a web browser, a web server and a database storing images and image descriptors each of which represents characteristics of the image, the method comprising the steps of: a) receiving a query image; b) requesting to retrieve an image based on a query image descriptor to the web server, the query image descriptor being extracted from the query image based on at least an angular component and a radial component of the query image; and c) receiving and displaying at least an image similar to the query image from the database.

In accordance with further another aspect of the present invention, there is provided a method for retrieving an image in a content-based image retrieval system including a web browser, a web server and a database storing images and image descriptors each of which represents characteristics of the image, the method comprising the steps of: a) receiving a query image from the web browser; b) extracting a query image descriptor from the query image based on at least an angular component and a radial component of the query image; c) comparing the query image descriptor with a plurality of image descriptors stored on the database, wherein the image descriptor is based on at least an angular component and a radial component of the image; d) arranging the image descriptors in order of a similarity to the query image descriptors; and e) allowing the database to provide at least an image similar to the query image to the web browser.

In accordance with still further another aspect of the present invention, there is provided a method for retrieving an image from a database storing images and image descriptors representing characteristics of the images, the method comprising the steps of: a) receiving a query image; b) extracting a query image descriptor from the query image based on at least an angular component and a radial component of the query image; c) comparing the query image descriptor with an image descriptor stored on the database; and d) determining a degree of a similarity between the query image descriptor and the image descriptor stored on the database.

In accordance with still another aspect of the present invention, there is provided a method for retrieving an image from a database storing images and image descriptors representing characteristics of the images, the method comprising the steps of: a) receiving a query image; b) extracting a query image descriptor from the query image based on at least an angular component and a radial component of the query image; c) comparing the query image descriptor with an image descriptor stored on the database; and d) determining a degree of a similarity between the query image descriptor and the image descriptor stored on the database.

In accordance with still another aspect of the present invention, there is provided data stream for use in retrieving an image, the data stream transmitted from a web browser to a web server, comprising: a retrieval request signal; and an image descriptor extracted from an image based on an angular component and a radial component of the image.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Hereinafter, preferred embodiments of the present invention will be described in detail with reference to the accompanying drawings.

Figure 1:
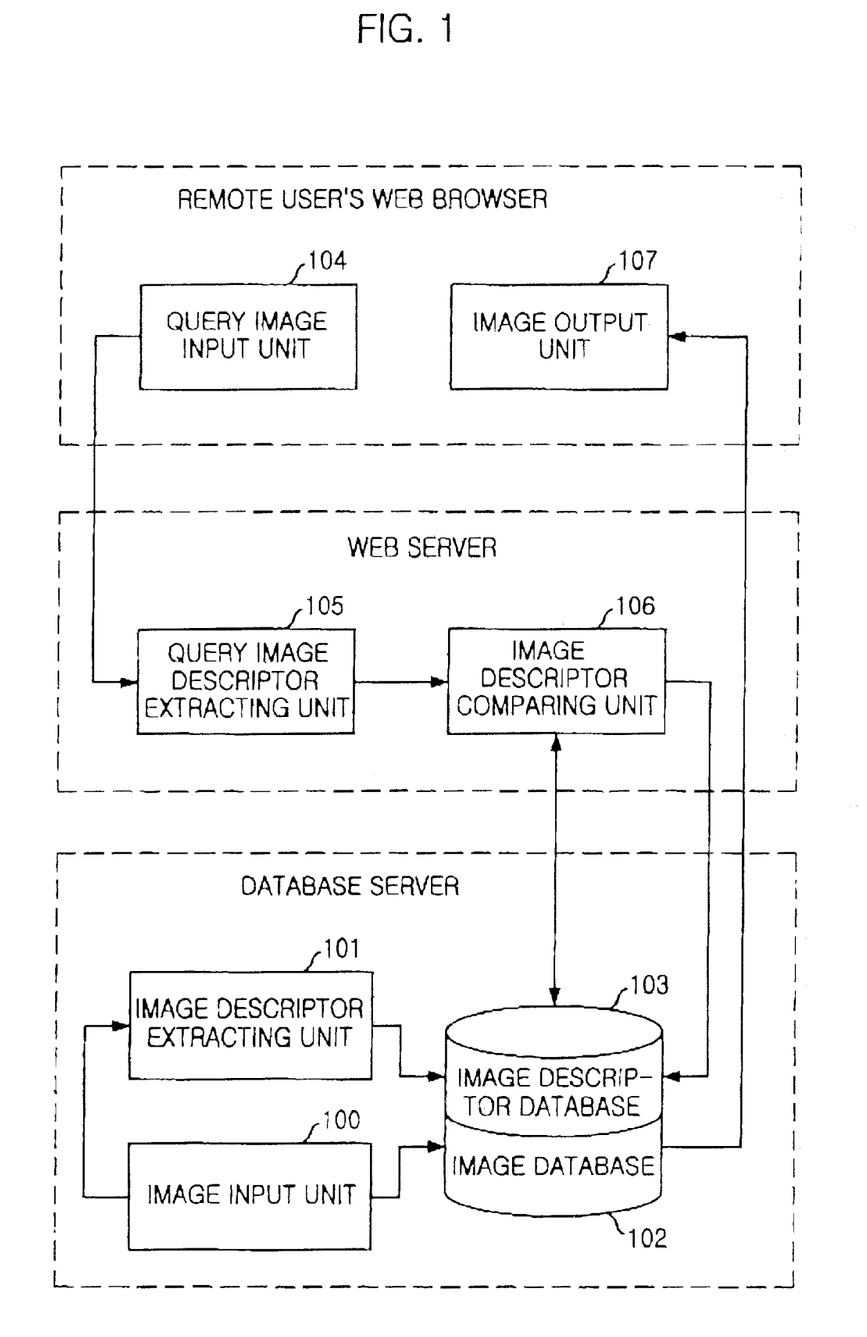
FIG. 1 is a block diagram of a content-based image retrieval system in accordance with the present invention.

Referring to FIG. 1, a content-based image retrieval system includes a web browser, a web server and a database server.

The database server includes an image input unit 100, an image descriptor extracting unit 101, an image database 102 and an image descriptor database 103. The image input unit 100 receives images in order to construct the image database 102 and the image descriptor database 103. The image descriptor extracting unit 101 extracts an angular radial transform (ART) image descriptor of the image received by the image input unit 100. The image database 102 stores a plurality of images received through the image input unit 100. The image descriptor database 103 stores a plurality of image descriptors of the images extracted in the image descriptor extracting unit 101, which are respectively linked to corresponding to the image. In other words, the image descriptor is linked to the image.

The web browser includes a query image input unit 104 and an image output unit 107. The query image input unit 104 receives a query image to be retrieved from a user and transmits the query image to a query image descriptor extracting unit 105 in the web server.

The query image descriptor extracting unit 105 extracts an image descriptor from the query image received from the query input unit 104. The image descriptor comparing unit 106 receives the image descriptor of the query image from the query image descriptor extracting unit 105 and compares the image descriptor of the query image with the image descriptor stored on the image descriptor database 103 in the database server, thereby determining a degree of similarity between the image descriptor of the query image and the stored image descriptor. After comparison between the image descriptor of the query image and all of the image descriptors stored on the image descriptor database, at least an image similar to the query image is received from the image database 102 and outputted in the image output unit 107.

In this embodiment, a shape descriptor, in more particular, an ART shape descriptor is used as an image descriptor for the content-based image retrieval. In other words, absolute values of a predetermined number of ART coefficients are used as the image descriptor.

The ART has a rotation invariance of the image, which is necessary for the content-based image retrieval. The rotation invariance to of the image means that the image descriptor has the same value when the image is rotated.

The ART is defined as following equation (2).

$$F_{nm} = <V_{nm}(\rho, \theta), f(\rho, \theta)> \quad (2)$$
$$= \int_0^{2\pi}\int_0^1 V^*_{nm}(\rho, \theta), f(\rho, \theta)\rho d\rho d\theta$$

where, $F_{nm}$ is an ART coefficient of order n and m, n and m are integer numbers, $V_{nm}(\rho, \theta)$ is an ART basis function, $f(\rho, \theta)$ is an image in polar coordinates, and * is a conjugate complex number.

The ART basis function $V_{nm}(\rho, \theta)$ is separable along the angular and the radial directions, which is expressed as following equation (3).

$$V_{nm}(\rho,\theta)=A_m(\theta)R_n(\theta) \quad (3)$$

where, $A_m(\theta)$ is an angular function and $R_n(\rho)$ is a radial function.

The angular function $A_m(\theta)$ is expressed as following equation (4).

$$A_m(\theta) = \frac{1}{2\pi}\exp(jm\theta) \quad (4)$$

The ART coefficient (see, the equation (2)) uses in a polar coordinate $(\rho, \theta)$ instead of a rectangular coordinate (x, y) in order to obtain the rotation invariance. The polar coordinate is expressed by a distance $\rho$ from the origin and an angle $\theta$ from the x-axis.

The radial function $R_n(\rho)$ includes some types. One of them is ART-C type radial function expressed by equation (5) as following.

$$ART - C: R_n^C(\rho) = \begin{cases} 1 & n = 0 \\ 2\cos(\pi n \rho) & n \neq 0 \end{cases} \quad (5)$$

Figure 4:
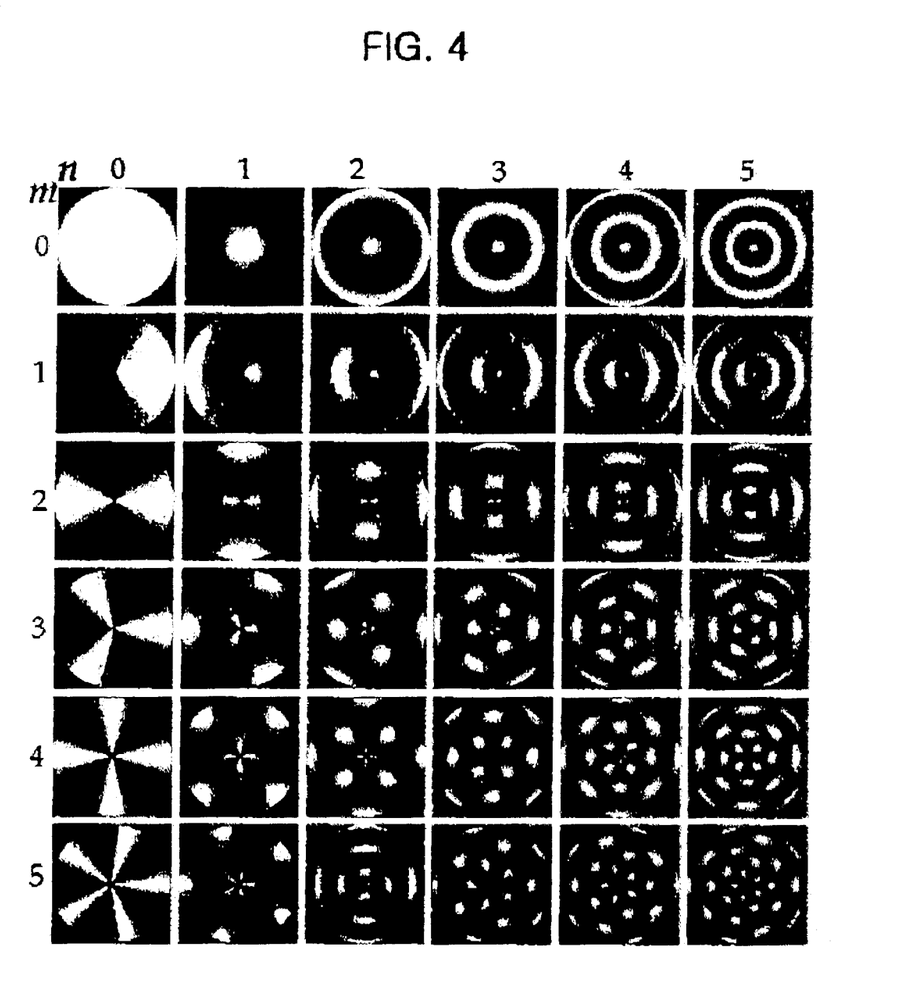
FIG. 4 shows a set of ART basis functions in accordance with the present invention.

The ART-C type ART basis function set is illustrated in FIG. 4

The ART coefficient $F_{nm}$ obtained by the equation (2) are a series of complex numbers. In this specification, the shape descriptor is defined as a vector of an absolute value of the ART coefficient $F_{nm}$ as following.

$$SD=\{\|F_{nm}\|\}$$

where, n=0, 1, 2, . . . , k and m=0, 1, 2, . . . , l.

The ART coefficient extracted from an original image represents how much the original image has the ART basis function component. Accordingly, a multiplication of the ART coefficient by the ART basis function restores the original image. In theory, combinations of infinite ART basis functions are necessary for obtaining the original image. However, in real, an approximate image to the original image can be obtained by combinations of only twenty to thirty ART basis functions (see, FIG. 5). In other words, the image can be expressed by twenty to thirty numbers, which means that the ART coefficient is a considerably efficient descriptor.

The ART basis function is orthogonal as can be seen from equation (7).

$$\int_0^{2\pi}\int_0^1 V_{nm}(\rho,\theta), V^*_{n'm'}(\rho,\theta)\rho\,d\tilde{n}d\tilde{e} = \delta(n-n', m-m') \tag{7}$$

where, δ is a Kronecker delta function which is 0 in case of n=n' and m=m' and 0 in the other cases.

The ART coefficient has the rotation invariance as can be seen from equation (8).

$$f^\alpha(\rho,\theta)=f(\rho,\alpha+\theta) \tag{8}$$

$f^\alpha(\rho, \theta)$ is an image rotated by an angle α from the original image $f(\rho, \theta)$.

The ART coefficient extracted from the rotated image $f^\alpha(\rho, \theta)$ can be obtained from equation (9) as following.

$$F^\alpha_{nm} = \int_0^{2\pi}\int_0^1 V^*_{nm}(\rho,\theta), f^\alpha(\rho,\theta)\rho d\tilde{n}d\tilde{e} \tag{9}$$

where, $F_{nm}{}^\alpha$ is an ART coefficient extracted from the rotated image $f^\alpha(\rho, \theta)$.

A relation between the image $f(\rho, \theta)$ and the rotated image $f^\alpha(\rho, \theta)$ is expressed as following equation (10).

$$F_{nm}{}^\alpha = F_{nm}\exp(-jm\alpha) \tag{10}$$

where, $F_{nm}$ and $F_{nm}{}^\alpha$ are the ART coefficient extracted from $f(\rho, \theta)$ and $f^\alpha(\rho, \theta)$.

An absolute value of $F_{nm}{}^\alpha$ is equal to the absolute value of $F_{nm}$, which is expressed by equation (11).

$$\|F_{nm}{}^\alpha\|=\|F_{nm}\| \tag{11}$$

Dissimilarity between the query image and the image in the database is expressed as following equation (12).

$$D = \sum_i w_i \times \|S_i^q - S_i^r\| \tag{12}$$

where D is dissimilarity between the query image and the image in the database, $w_i$ is a constant coefficient, $S_i^q$ the i-th image descriptor of the query image, $S_i^r$ the i-th image descriptor of the image in the database.

Hereinafter, a content-based image retrieval method using the ART image descriptor will be described in detail.

Figure 2:
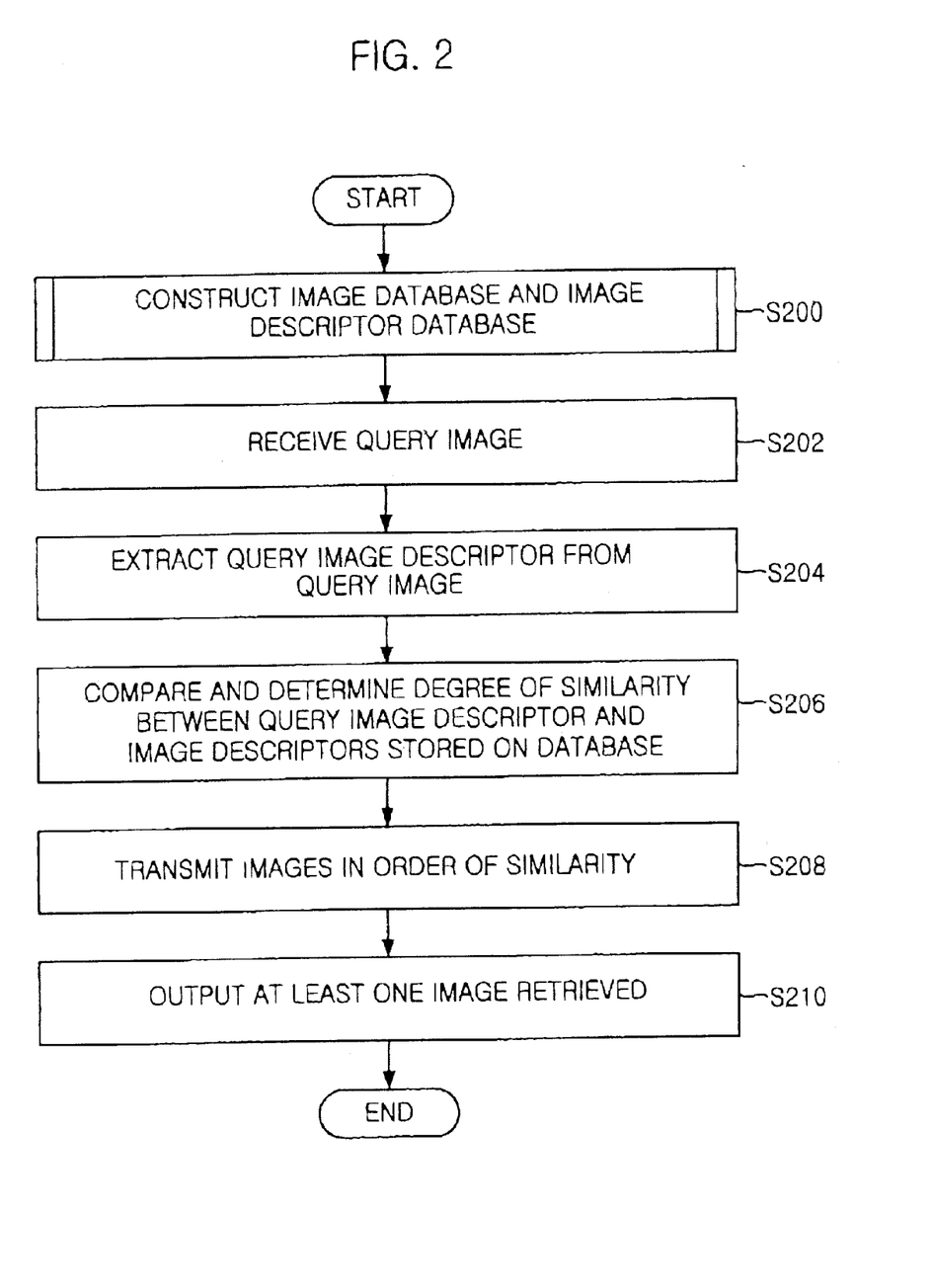
FIG. 2 is a flow chart illustrating a content-based image retrieval method in accordance with the present invention.

FIG. 2 is a flow chart illustrating a content-based image retrieval method in accordance with the present invention.

First, at step S200, the image descriptor database 103 and the image database 102 are constructed based on information inputted through the image input unit 100 and the image descriptor extracting unit 101.

A query image is received in the query image input unit 104 from a user at step S202. The query image input unit 104 provides three types of input method. One is that the user is allowed to directly draw the query image by using an input device, e.g., a mouse or a digitizer. Another is that the user is allowed to select one of prototype images provided by the web server. Another is that the user is allowed to select one of images stored on a storage device, e.g., a hard disk, a floppy disk or a CD-ROM.

Then, an image descriptor of the query image are extracted and transmitted to the image descriptor comparing unit 106 in the query image descriptor extracting unit 105 at step S204. The image descriptor of the query image is compared with the image descriptors stored on the database, at step S206, thereby calculating similarities between the query image and the images stored on the database. Images corresponding to the image descriptors, which are determined as similar to the image descriptor of the query image, are obtained from the image database 102, arranged in order of the similarity and transmitted to the image output unit 107 at step S208. The retrieved image(s), at least an image similar to the query image, is outputted through the image output unit 107 at step S210.

Here, the retrieved image may be reused as a prototype image. The user can modify the prototype image and request to retrieve again by using the modified prototype image as the query image.

Sample images are provided to the user as prototype images through the image output unit 107 at initial connection to the server. If the user selects one of the prototype images, the selected one is transmitted to the query image input unit 104.

Figure 3:
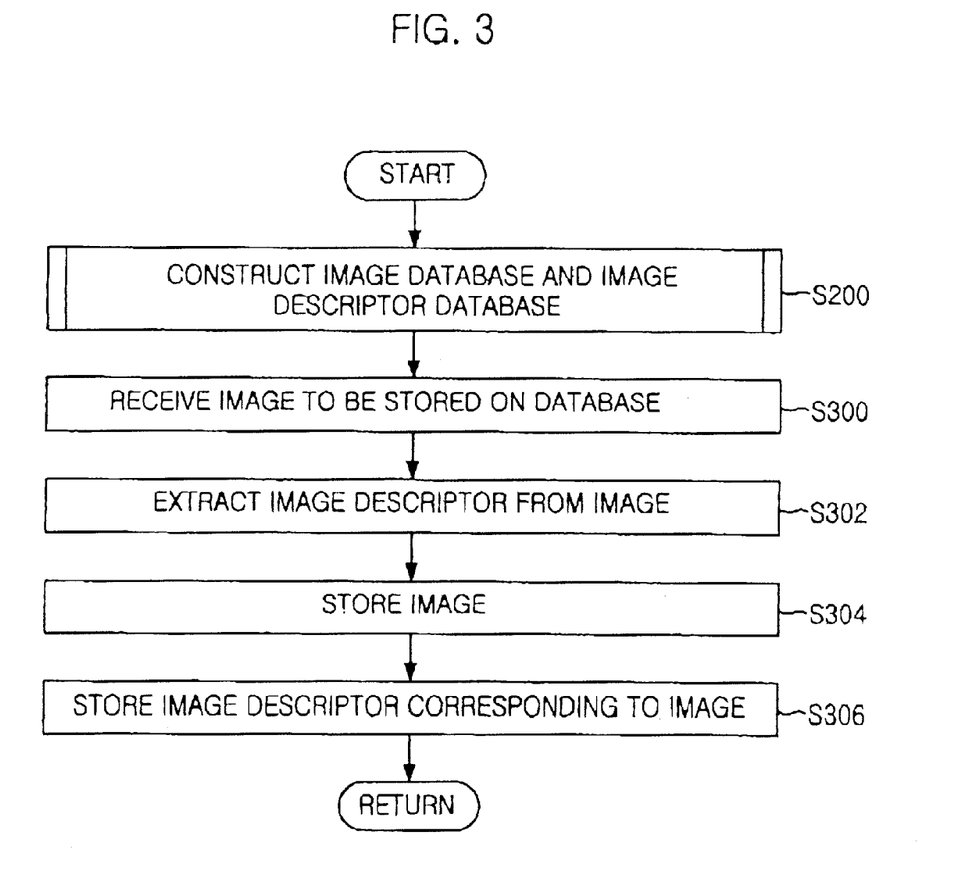
FIG. 3 is a flow chart illustrating a database construction process of FIG. 2.

FIG. 3 is a flow chart illustrating a database construction process of FIG. 2.

The image to be stored on the database is inputted through the image input unit 100 at step S300. The image descriptor of the image are extracted from the image at step S302 and the image is stored onto the image database 102 through the image input unit 100 at step S304. The extracted image descriptor corresponding to the image is stored onto the image descriptor database 103 at step 306.

FIG. 4 shows a set of ART basis functions in accordance with the present invention.

Referring to FIG. 4, a set of ART-C type ART basis functions expressed by the equation (5) is illustrated. The reference number n denotes a distance from the origin and m does an angle from the x-axis.

Figure 5:
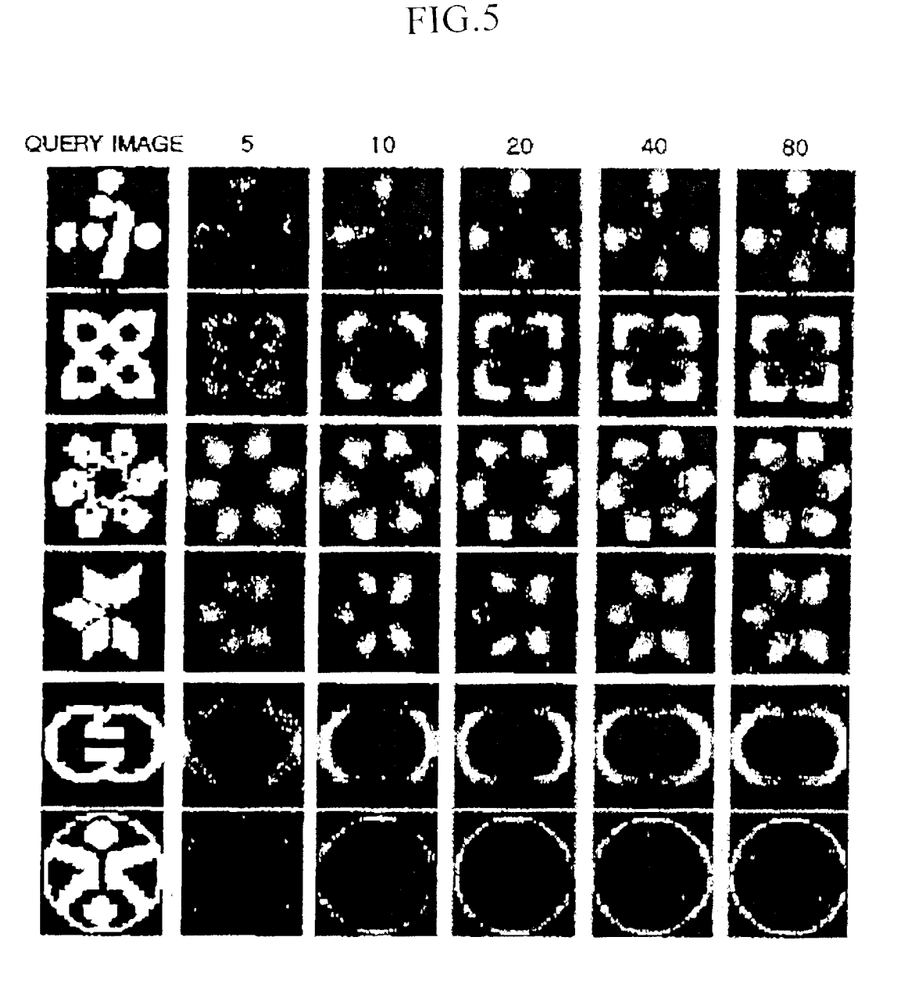
FIG. 5 depicts an exemplary diagram of classified images in accordance with the present invention.

FIG. 5 depicts an exemplary diagram of classified images in accordance with the present invention.

The image similar to the query image is restored by using the equation (2) representing the ART definition equation.

Numbers of FIG. 5 denote the numbers of combined ART coefficients. As can be seen, as the numbers of the ART definition equations combined are increased, more similar image to the query image becomes to be combined.

In the content-based image retrieval system and method for retrieving image using the same as mentioned above, since the ART coefficients using the orthogonal basis function are utilized as an image descriptor, the image descriptor has a rotation invariance and no repetition of information. Since the ART descriptor used in the present invention effectively describes the angular and the radial directions of the image, thereby representing the image close to visual characteristics of human beings. Similar images to the query image can be rapidly and accurately retrieved. Also, either the query image inputted by the user or the retrieved image is used as the prototype image, thereby retrieving images in detail.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

What is claimed is:

1. A method for constructing a database storing images and image descriptors representing characteristics of the images, the method comprising the steps of:
   a) receiving an image;
   b) extracting an image descriptor from the image based on at least an angular component and a radial component of the image;
   c) storing the image on an image database; and
   d) storing the image descriptor on an image descriptor database,
   wherein the image descriptor includes j (j is a natural number) ART coefficients each of which is expressed as:

$$F_{nm} = <V_{nm}(\rho, \theta), f(\rho, \theta)>$$
$$= \int_0^{2\pi}\int_0^1 V_{nm}^*(\rho, \theta), f(\rho, \theta)\rho d\rho d\theta$$

where, $F_{nm}$ is an ART coefficient of order n and m, n and m are integer numbers, $V_{nm}(\rho,\theta)$ is an ART basis function, $f(\rho,\theta)$ is an image in polar coordinates, and * denotes a conjugate complex number.

2. The method as recited in claim 1, wherein the ART coefficient includes an ART basis function expressed as:

$$V_{nm}(\rho,\theta)=A_m(\theta)R_n(\rho)$$

where, $A_m(\theta)$ is an angular function and $R_n(\rho)$ is a radial function.

3. The method as recited in claim 2, wherein the angular function $A_m(\theta)$ includes an exponential function having a rotation invariance, which is expressed as:

$$A_m(\theta) = \frac{1}{2\pi}\exp(jm\theta)$$

where, θ is an angle from an x-axis.

4. The method as recited in claim 2, wherein the radial function $R_n(\rho)$ is an even cosine function, which is expressed as:

$$R_n^C(\rho) = \begin{cases} 1 & n=0 \\ 2\cos(\pi n\rho) & n \neq 0 \end{cases}$$

where, ρ is a distance from an origin.

5. A method for retrieving an image in a content-based image retrieval system including a web browser, a web server and a database storing images and image descriptors each of which represents characteristics of the image, the method comprising the steps of:
   a) receiving a query image;
   b) requesting to retrieve an image based on a query image descriptor to the web server, the query image descriptor being extracted from the query image based on at least an angular component and a radial component of the query image; and
   c) receiving and displaying at least an image similar to the query image from the database,
   wherein the image descriptor includes j (j is a natural number) ART coefficients each of which is expressed as:

$$F_{nm} = <V_{nm}(\rho, \theta), f(\rho, \theta)>$$
$$= \int_0^{2\pi}\int_0^1 V_{nm}^*(\rho, \theta), f(\rho, \theta)\rho d\rho d\theta$$

where, $F_{nm}$ is an ART coefficient of order n and m, n and m are integer numbers, $V_{nm}(\rho,\theta)$ is an ART basis function, $f(\rho,\theta)$ is an image in polar coordinates, and * denotes a conjugate complex number.

6. The method as recited in claim 5, wherein the ART coefficient includes an ART basis function expressed as:

$$V_{nm}(\rho,\theta)=A_m(\theta)R_n(\rho)$$

where, $A_m(\theta)$ is an angular function and $R_n(\rho)$ is a radial function.

7. The method as recited in claim 6, wherein the angular function $A_m(\theta)$ includes an exponential function having a rotation invariance and is expressed as:

$$A_m(\theta) = \frac{1}{2\pi}\exp(jm\theta)$$

where, θ is an angle from an x-axis.

8. The method as recited in claim 6, wherein the radial function $R_n(\rho)$ is an even cosine function, which is expressed as:

$$R_n(\rho) = \begin{cases} 1 & n=0 \\ 2\cos(\pi n\rho) & n \neq 0 \end{cases}$$

where, ρ is a distance from an origin.

9. The method as recited in claim 5, where the step a) includes the step of:
   receiving an image stored on the database as the query image.

10. The method as recited in claim 5, where the step a) includes the step of:
    receiving an image stored on a memory device as the query image.

11. The method as recited in claim 5, where the step a) includes the step of:
    receiving an image drawn by a user as the query image.

12. The method as recited in claim 5, wherein the step d) includes the step of:
    selecting images similar to the query image based on a dissimilarity between the query image and the image stored on the database,
    wherein the dissimilarity being expressed as:

$$D = \sum_i w_i \times \|S_i^q - S_i^r\|$$

where D is a dissimilarity between the query image and the image in the database, $w_i$ is a constant coefficient, $S_i^q$ is the i-th image descriptor of the query image, $S_i^r$ is the i-th image descriptor of the image in the database.

13. A method for retrieving an image in a content-based image retrieval system including a web browser, a web server and a database storing images and image descriptors each of which represents characteristics of the image, the method comprising the steps of:

a) receiving a query image from the web browser;
b) extracting a query image descriptor from the query image based on at least an angular component and a radial component of the query image;
c) comparing the query image descriptor with a plurality of image descriptors stored on the database, wherein the image descriptor is based on at least an angular component and a radial component of the image;
d) arranging the image descriptors in order of a similarity to the query image descriptors; and
e) allowing the database to provide at least an image similar to the query image to the web browser, wherein the image descriptor includes j (j is a natural number) ART coefficients each of which is expressed as:

$$F_{nm} = <V_{nm}(\rho, \theta), f(\rho, \theta)>$$
$$= \int_0^{2\pi}\int_0^1 V_{nm}^*(\rho, \theta), f(\rho, \theta)\rho d\rho d\theta$$

where, $F_{nm}$ is an ART coefficient of order n and m, n and m are integer numbers, $V_{nm}(\rho,\theta)$ is an ART basis function, $f(\rho,\theta)$ is an image in polar coordinates, and * denotes a conjugate complex number.

14. The method as recited in claim 13, wherein the ART coefficient includes an ART basis function expressed as:

$$V_{nm}(\rho,\theta)=A_m(\theta)R_n(\rho)$$

where, $A_m(\theta)$ is an angular function and $R_n(\rho)$ is a radial function.

15. The method as recited in claim 14, wherein the angular function $A_m(\theta)$ includes an exponential function having rotation invariance, which is expressed as:

$$A_m(\theta) = \frac{1}{2\pi}\exp(jm\theta)$$

where, $\theta$ is an angle from an x-axis.

16. The method as recited in claim 14, wherein the radial function $R_n(\rho)$ is an even cosine function, which is expressed as:

$$R_n(\rho) = \begin{cases} 1 & n = 0 \\ 2\cos(\pi n\rho) & n \neq 0 \end{cases}$$

where, $\rho$ is a distance from an origin.

17. The method as recited in claim 13, where the step a) includes the step of:
receiving an image stored on the database as the query image.

18. The method as recited in claim 13, where the step a) includes the step of:
receiving an image stored on a memory device as the query image.

19. The method as recited in claim 13, where the step a) includes the step of:
receiving an image drawn by a user as the query image.

20. The method as recited in claim 13, wherein the step d) includes the step of:
selecting images similar to the query image based on a dissimilarity between the query image and the image stored on the database,
wherein the dissimilarity being expressed as:

$$D = \sum_i w_i \times \|S_i^q - S_i^r\|$$

where D is dissimilarity between the query image and the image in the database, $w_i$ is a constant coefficient, $S_i^q$ is the i-th image descriptor of the query image, $S_i^r$ is the i-th image descriptor of the image in the database.

21. A method for retrieving an image in a content-based image retrieval system, the method comprising the steps of:

a) receiving a query image;
b) extracting a query image descriptor from the query image based on at least an angular component and a radial component of the query image;
c) comparing the query image descriptor with an image descriptor stored on the database; and
d) determining a degree of a similarity between the query image descriptor and the image descriptor stored on the database, wherein the image descriptor includes j (j is a natural number) ART coefficients each of which is expressed as:

$$F_{nm} = <V_{nm}(\rho, \theta), f(\rho, \theta)>$$
$$= \int_0^{2\pi}\int_0^1 V_{nm}^*(\rho, \theta), f(\rho, \theta)\rho d\rho d\theta$$

where, $F_{nm}$ is an ART coefficient of order n and m, n and m are integer numbers, $V_{nm}(\rho,\theta)$ is an ART basis function, $f(\rho,\theta)$ is an image in polar coordinates, and * denotes a conjugate complex number.

22. The method as recited in claim 21, further comprising the steps of:

e) repeating the step c) and d) until there is an image to be retrieved; and
f) outputting at least an image corresponding to the image descriptor similar to the query image descriptor.

23. The method as recited in claim 21, wherein the ART coefficient includes an ART basis function expressed as:

$$V_{nm}(\rho,\theta)=A_m(\theta)R_n(\rho)$$

where, $A_m(\theta)$ is an angular function and $R_n(\rho)$ is a radial function.

24. The method as recited in claim 23, wherein the angular function $A_m(\theta)$ includes an exponential function having rotation invariance, which is expressed as:

$$R_n(\rho) = \begin{cases} 1 & n = 0 \\ 2\cos(\pi n\rho) & n \neq 0 \end{cases}$$

where, $\theta$ is an angle from an x-axis.

25. The method as recited in claim 23, wherein the radial function $R_n(\rho)$ is an even cosine function, which is expressed as:

$$R_n(\rho) = \begin{cases} 1 & n = 0 \\ 2\cos(\pi n\rho) & n \neq 0 \end{cases}$$

where, $\rho$ is a distance from an origin.

26. The method as recited in claim 21, where the step a) includes the step of:

receiving an image stored on the database as the query image.

27. The method as recited in claim 21, where the step a) includes the step of:
receiving an image stored on a memory device as the query image.

28. The method as recited in claim 21, where the step a) includes the step of:
receiving an image drawn by a user as the query image.

29. The method as recited in claim 21, wherein the step d) includes the step of:
selecting images similar to the query image based on a dissimilarity between the query image and the image stored on the database,
wherein the dissimilarity being expressed as:

$$D = \sum_i w_i \times \|S_i^q - S_i^r\|$$

where D is dissimilarity between the query image and the image in the database, $w_i$, is a constant coefficient, $S_i^q$ is the i-th image descriptor of the query image, $S_i^r$ is the i-th image descriptor of the image in the database.

30. An apparatus for constructing a database storing images and image descriptors representing characteristics of the images, the apparatus comprising:
means for receiving an image;
means for extracting an image descriptor from the image based on at least an angular component and a radial component of the image;
means for storing the image on an image database; and
means for storing the image descriptor on an image descriptor database,
wherein the image descriptor includes j (j is a natural number) ART coefficients each of which is expressed as:

$$F_{nm} = <V_{nm}(\rho, \theta), f(\rho, \theta)>$$
$$= \int_0^{2\pi}\int_0^1 V_{nm}^*(\rho, \theta), f(\rho, \theta)\rho d\rho d\theta$$

where, $F_{nm}$ is an ART coefficient of order n and m, n and m are integer numbers, $V_{nm}(\rho,\theta)$ is an ART basis function, $f(\rho,\theta)$ is an image in polar coordinates, and * denotes a conjugate complex number.

31. The apparatus as recited in claim 30, wherein the ART coefficient includes an ART basis function expressed as:

$$V_{nm}(\rho,\theta)=A_m(\theta)R_n(\rho)$$

where, $A_m(\theta)$ is an angular function and $R_n(\rho)$ is a radial function.

32. The apparatus as recited in claim 31, wherein the angular function $A_m(\theta)$ includes an exponential function having a rotation invariance, which is expressed as:

$$F_{nm} = <V_{nm}(\rho, \theta), f(\rho, \theta)>$$
$$= \int_0^{2\pi}\int_0^1 V_{nm}^*(\rho, \theta), f(\rho, \theta)\rho d\rho d\theta$$

where, $\theta$ is an angle from an x-axis.

33. The apparatus as recited in claim 31, wherein the radial function $R_n(\rho)$ is an even cosine function, which is expressed as:

$$R_n(\rho) = \begin{cases} 1 & n = 0 \\ 2\cos(\pi n\rho) & n \neq 0 \end{cases}$$

where, $\rho$ is a distance from an origin.

34. A content-based retrieval system for retrieving an image in a content-based image retrieval system including a web browser, a web server and a database storing images and image descriptors each of which represents characteristics of the image, the system comprising:
means for receiving a query image;
means for extracting a query image descriptor from the query image based on at least an angular component and a radial component of the query image;
means for requesting to retrieve an image based on the query image descriptor to the web server; and
means for receiving and displaying at least an image similar to the query image from the database,
wherein the image descriptor includes j (j is a natural number) ART coefficients each of which is expressed as:

$$F_{nm} = <V_{nm}(\rho, \theta), f(\rho, \theta)>$$
$$= \int_0^{2\pi}\int_0^1 V_{nm}^*(\rho, \theta), f(\rho, \theta)\rho d\rho d\theta$$

where, $F_{nm}$ is an ART coefficient of order n and m, n and m are integer numbers, $V_{nm}(\rho,\theta)$ is an ART basis function, $f(\rho,\theta)$ is an image in polar coordinates, and * denotes a conjugate complex number.

35. The system as recited in claim 34, wherein the ART coefficient includes an ART basis function expressed as:

$$V_{nm}(\rho,\theta)=A_m(\theta)R_n(\rho)$$

where, $A_m(\theta)$ is an angular function and $R_n(\rho)$ is a radial function.

36. The system as recited in claim 35, wherein the angular function $A_m(\theta)$ includes an exponential function having a rotation invariance, which is expressed as:

$$F_{nm} = <V_{nm}(\rho, \theta), f(\rho, \theta)>$$
$$= \int_0^{2\pi}\int_0^1 V_{nm}^*(\rho, \theta), f(\rho, \theta)\rho d\rho d\theta$$

where, $\theta$ is an angle from an x-axis.

37. The system as recited in claim 35, wherein the radial function $R_n(\rho)$ is an even cosine function, which is expressed as:

$$R_n(\rho) = \begin{cases} 1 & n = 0 \\ 2\cos(\pi n\rho) & n \neq 0 \end{cases}$$

where, $\rho$ is a distance from an origin.

38. The system as recited in claim 34, where the means for receiving a query image includes:
means for receiving an image stored on the database as the query image.

39. The method as recited in claim 34, where the means for receiving a query image includes: means for receiving an image stored on a memory device as the query image.

40. The method as recited in claim 34, where the means for receiving a query image includes:

means for receiving an image drawn by a user as the query image.

41. The system as recited in claim 34, wherein images similar to the query image are selected based on a dissimilarity between the query image and the image stored on the database, wherein the dissimilarity being expressed as:

$$D = \sum_i w_i \times \|S_i^q - S_i^r\|$$

where D is a dissimilarity between the query image and the image in the database, $w_i$ is a constant coefficient, $S_i^q$ is the i-th image descriptor of the query image, $S_i^r$ is the i-th image descriptor of the image in the database.

42. A content-based system for retrieving an image in a content-based image retrieval system including a web browser, a web server and a database storing images and image descriptors each of which represents characteristics of the image, the system comprising:

means for receiving a query image from the web browser;

means for extracting a query image descriptor from the query image based on at least an angular component and a radial component of the query image;

means for comparing the query image descriptor with a plurality of image descriptors stored on the database, wherein the image descriptor is based on at least an angular component and a radial component of the image;

means for arranging the image descriptors in order of a similarity to the query image descriptors; and means for allowing the database to provide at least an image similar to the query image to the web browser, wherein the image descriptor includes j (j is a natural number) ART coefficients each of which is expressed as:

$$F_{nm} = <V_{nm}(\rho, \theta), f(\rho, \theta)>$$
$$= \int_0^{2\pi} \int_0^1 V_{nm}^*(\rho, \theta), f(\rho, \theta) \rho d\rho d\theta$$

where, $F_{nm}$ is an ART coefficient of order n and m, n and m are integer numbers, $V_{nm}(\rho,\theta)$ is an ART basis function, $f(\rho,\theta)$ is an image in polar coordinates, and * denotes a conjugate complex number.

43. The system as recited in claim 42, wherein the ART coefficient includes an ART basis function expressed as:

$$V_{nm}(\rho,\theta) = A_m(\theta) R_n(\rho)$$

where, $A_m(\theta)$ is an angular function and $R_n(\rho)$ is a radial function.

44. The system as recited in claim 43, wherein the angular function $A_m(\theta)$ includes an exponential function having rotation invariance, which is expressed as:

$$A_m(\theta) = \frac{1}{2\pi} \exp(jm\theta)$$

where, $\theta$ is an angle from an x-axis.

45. The system as recited in claim 43, wherein the radial function $R_n(\rho)$ is an even cosine function, which is expressed as:

$$R_n(\rho) = \begin{cases} 1 & n = 0 \\ 2\cos(\pi n\rho) & n \neq 0 \end{cases}$$

where, $\rho$ is a distance from an origin.

46. The system as recited in claim 42, wherein the means for receiving a query image includes:

means for receiving an image stored on the database as the query image.

47. The system as recited in claim 42, wherein the means for receiving a query image includes:

means for receiving an image stored on a memory device as the query image.

48. The system as recited in claim 42, where wherein the means for receiving a query image includes:

means for receiving an image drawn by a user as the query image.

49. The system as recited in claim 42, wherein images similar to the query image are selected based on a dissimilarity between the query image and the image stored on the database, wherein the dissimilarity being expressed as:

$$D = \sum_i w_i \times \|S_i^q - S_i^r\|$$

where D is dissimilarity between the query image and the image in the database, $w_i$ is a constant coefficient, $S_i^q$ is the i-th image descriptor of the query image, $S_i^r$ is the i-th image descriptor of the image in the database.

50. A content-based system for retrieving an image from a database storing images and image descriptors representing characteristics of the images, the system comprising:

means for receiving a query image;

means for extracting a query image descriptor from the query image based on at least an angular component and a radial component of the query image;

means for comparing the query image descriptor with an image descriptor stored on the database; and means for determining a degree of a similarity between the query image descriptor and the image descriptor stored on the database, wherein the image descriptor includes j (j is a natural number) ART coefficients each of which is expressed as:

$$F_{nm} = <V_{nm}(\rho, \theta), f(\rho, \theta)>$$
$$= \int_0^{2\pi} \int_0^1 V_{nm}^*(\rho, \theta), f(\rho, \theta) \rho d\rho d\theta$$

where, $F_{nm}$ is an ART coefficient of order n and m, n and m are integer numbers, $V_{nm}(\rho,\theta)$ is an ART basis function, $f(\rho,\theta)$ is an image in polar coordinates, and * denotes a conjugate complex number.

51. The system as recited in claim 50, further comprising:

means for outputting at least an image corresponding to the image descriptor similar to the query image descriptor.

52. The system as recited in claim 50, wherein the ART coefficient includes an ART basis function expressed as:

$$V_{nm}(\rho,\theta) = A_m(\theta) R_n(\rho)$$

where, $A_m(\theta)$ is an angular function and $R_n(\rho)$ is a radial function.

53. The system as recited in claim 52, wherein the angular function $A_m(\theta)$ includes an exponential function having rotation invariance, which is expressed as:

$$A_m(\theta) = \frac{1}{2\pi}\exp(jm\theta)$$

where, $\theta$ is an angle from an x-axis.

54. The system as recited in claim 52, wherein the radial function $R_n(\rho)$ is an even cosine function, which is expressed as:

$$R_n(\rho) = \begin{cases} 1 & n = 0 \\ 2\cos(\pi n\rho) & n \neq 0 \end{cases}$$

where, $\rho$ is a distance from an origin.

55. The system as recited in claim 50, wherein the means for receiving a query image includes:
   means for receiving an image stored on the database as the query image.

56. The system as recited in claim 50, wherein the means for receiving a query image includes:
   means for receiving an image stored on a memory device as the query image.

57. The system as recited in claim 50, wherein the means for receiving a query image includes:
   means for receiving an image drawn by a user as the query image.

58. The system as recited in claim 50, wherein images similar to the query image are selected based on a dissimilarity between the query image and the image stored on the database,
   wherein the dissimilarity being expressed as:

$$D = \sum_i w_i \times \|S_i^q - S_i^r\|$$

where D is dissimilarity between the query image and the image in the database, $w_i$ is a constant coefficient, $S_i^q$ is the i-th image descriptor of the query image, $S_i^r$ the i-th image descriptor of the image in the database.

59. A computer readable medium having instructions for executing a method for retrieving an image in a content-based image retrieval system including a web browser, a web server and a database storing images and image descriptors each of which represents characteristics of the image, the method comprising the steps of:
   a) receiving a query image;
   b) requesting to retrieve an image based on the query image descriptor to the web server, the query image descriptor being extracted from the query image based on at least an angular component and a radial component of the query image; and
   c) receiving and displaying at least an image similar to the query image from the database,
   wherein the image descriptor includes j (j is a natural number) ART coefficients each of which is expressed as:

$$F_{nm} = <V_{nm}(\rho, \theta), f(\rho, \theta)>$$

$$= \int_0^{2\pi}\int_0^1 V_{nm}^*(\rho, \theta), f(\rho, \theta)\rho d\rho d\theta$$

where, $F_{nm}$ is an ART coefficient of order n and m, n and m are integer numbers, $V_{nm}(\rho,\theta)$ is an ART basis function, $f(\rho,\theta)$ is an image in polar coordinates, and * denotes a conjugate complex number.

60. A computer readable medium having instructions for executing a method for retrieving an image in a content-based image retrieval system including a web browser, a web server and a database storing images and image descriptors each of which represents characteristics of the image, the method comprising the steps of:
   a) receiving a query image from the web browser;
   b) extracting a query image descriptor from the query image based on at least an angular component and a radial component of the query image;
   c) comparing the query image descriptor with a plurality of image descriptors stored on the database, wherein the image descriptor is based on at least an angular component and a radial component of the image;
   d) arranging the image descriptors in order of a similarity to the query image descriptors; and
   e) allowing the database to provide at least an image similar to the query image to the web browser,
   wherein the image descriptor includes j (j is a natural number) ART coefficients each of which is expressed as:

$$F_{nm} = <V_{nm}(\rho, \theta), f(\rho, \theta)>$$

$$= \int_0^{2\pi}\int_0^1 V_{nm}^*(\rho, \theta), f(\rho, \theta)\rho d\rho d\theta$$

where, $F_{nm}$ is an ART coefficient of order n and m, n and m are integer numbers, $V_{nm}(\rho,\theta)$ is an ART basis function, $f(\rho,\theta)$ is an image in polar coordinates, and * denotes a conjugate complex number.

61. A computer readable medium having instructions executing a method for retrieving an image in a content-based image retrieval system having a processor, the method comprising the steps of:
   a) receiving a query image;
   b) extracting a query image descriptor from the query image based on at least an angular component and a radial component of the query image;
   c) comparing the query image descriptor with an image descriptor stored on the database; and
   d) determining a degree of a similarity between the query image descriptor and the image descriptor stored on the database,
   wherein the image descriptor includes j (j is a natural number) ART coefficients each of which is expressed as:

$$F_{nm} = <V_{nm}(\rho, \theta), f(\rho, \theta)>$$

$$= \int_0^{2\pi}\int_0^1 V_{nm}^*(\rho, \theta), f(\rho, \theta)\rho d\rho d\theta$$

where, $F_{nm}$ is an ART coefficient of order n and m, n and m are integer numbers, $V_{nm}(\rho,\theta)$ is an ART basis function, $f(\rho,\theta)$ is an image in polar coordinates, and * denotes a conjugate complex number.

* * * * *